3,287,488
SERVICE CABLE ENTRANCE FITTING
Raymond F. Piasecki and Richard Samer, Hazlet, N.J., assignors to The Thomas & Betts Co., Incorporated, Elizabeth, N.J., a corporation of New Jersey
Filed Feb. 17, 1964, Ser. No. 345,504
4 Claims. (Cl. 174—81)

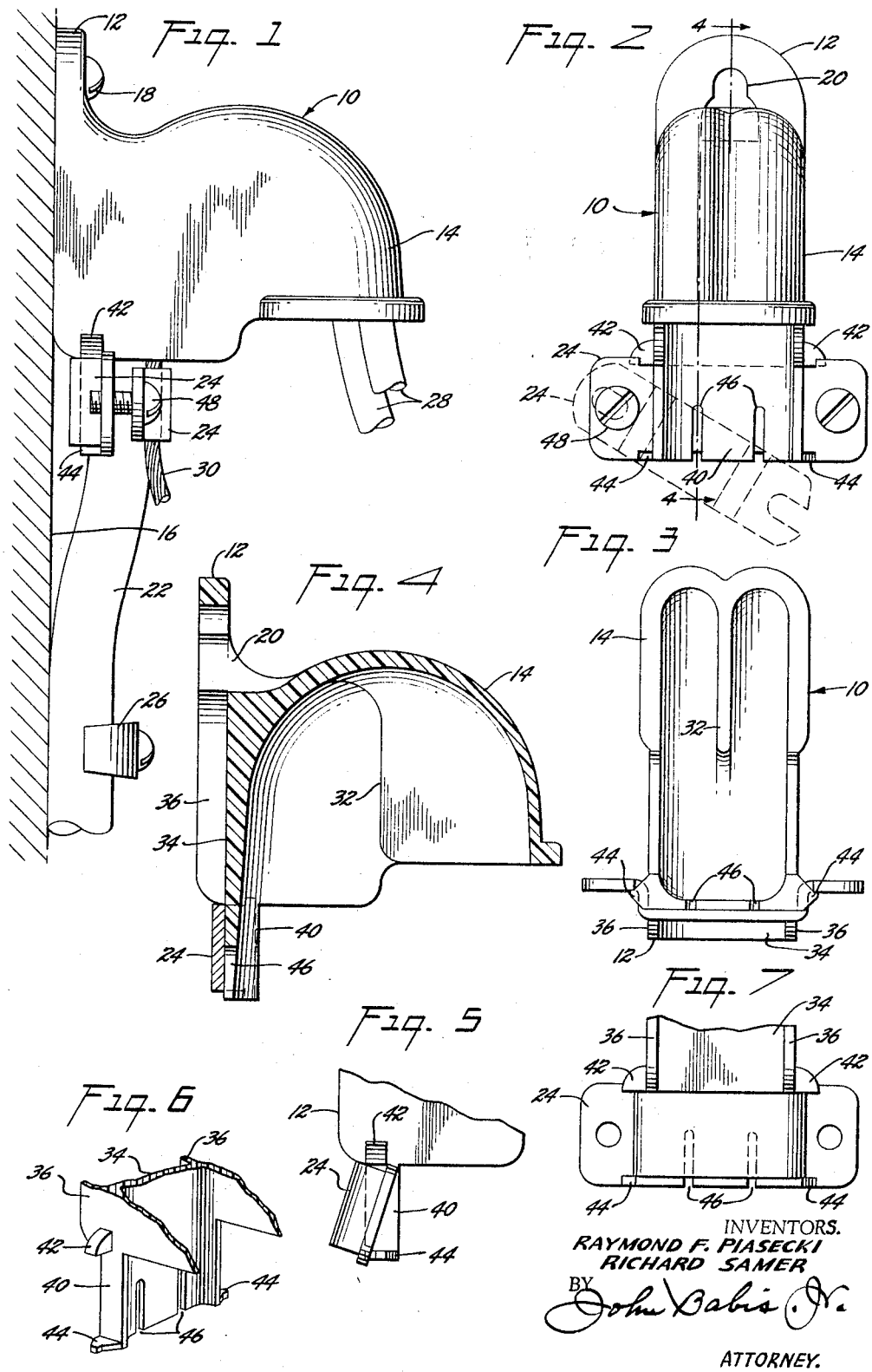

This invention relates to service cable entrance fittings adapted for use in connecting a service entrance cable to outside electric power lines. More particularly, the invention resides in a hooded, no-metallic service cable entrance fitting, in different sizes, which is adapted to be secured or attached to building structure generally for the sole reception and/or connection thereto of non-metallic, sheathed electric service cable of corresponding size or capacity.

Heretofore, service entrance fittings were heavy, expensive and usually employed with rigid metallic raceway conduit. Frequently, however, such heavy, cast metal service entrance fittings were utilized with non-metallic service entrance cable as shown, for example, in FIGURE 8, of Curtiss Patent 2,993,084. However, since such non-metallic service cable is not adapted for supporting a heavy, metallic service entrance fitting, it was necessary to securely fasten the fitting to a building structure by suitable means. Thus, the use of such non-metallic cable with heavy, metal entrance fittings presented an unsightly, unbalanced, non-complimentary appearance.

Accordingly, it is an object of the invention to provide an electric service cable entrance fitting which is adapted exclusively for use with non-metallic, sheathed electric service cable.

A further object of the invention is to provide an electric service cable entrance fitting which is light in weight, cheaper to produce, weather proof, efficient in use and which presents a complimentary and pleasing appearance with non-metallic, sheathed service entrance cable.

Another object of the invention is to provide a service entrance fitting of the character described in which relative expansion and contraction between the plastic hood or cap and one part of a split metal clamp secured thereto, does not effect the tenacious snap-action therebetween.

A further object of the invention is to provide a service entrance fitting of the character described in which one part of a split metal clamp forms an integral part of the plastic hood without being secured thereto by bolts, screws or other adjustable metallic means or, without being molded therein or thereon in fixed relation.

Another object of the invention is to provide a service entrance fitting of the character described which consists of a minimum number of parts, is extremely simple, obviates possibility of a short circuit, may be attached to a service cable while on the ground, may be readily secured in place on a building wall, and which may be readily inspected after installation.

With the above and other objects in view, the invention resides in the novel construction, and arrangement of parts, the novel features of which are set forth with particularity in the appended claims, the invention itself, however, both as to its organization and method of mounting, together with additional objects and advantages thereof, being best understood from the following description of a specific embodiment thereof, when considered in conjunction with the accompanying drawing in which:

FIGURE 1 is a side elevational view showing the improved service entrance head as assembled with a non-metallic, sheathed, service entrance cable and secured in place on a building wall;

FIGURE 2 is a front view in elevation of the service entrance head per se;

FIGURE 3 is a bottom end view in elevation of the service entrance head per se as shown in FIGURE 2;

FIGURE 4 is a vertical sectional view taken on the line 4—4 of FIGURE 2;

FIGURE 5 is a fragmentary detail view in elevation of the bottom end portion of the service entrance head shown in FIGURE 1, illustrating the manner in which the rear half of an adjustable screw clamp is snapped into locked engagement with the novel end portion of the service entrance head;

FIGURE 6 is a fragmentary perspective view of the depending end portion of the recessed wall engaging edge face of the hood member showing the spaced projections on opposite margins thereof and the open ended slots extending inwardly from its bottom end, and FIGURE 7 is a fragmentary end view of the rear face of the depending end portion of the hood member illustrating the manner in which the spaced marginal projections integral therewith co-act with the bent end portions of one member of a complimentary, adjustable split clamp.

Referring to the drawings and to FIGURE 1, in particular, the invention resides in a unitary electric service entrance fitting 10, of high impact plastic such as a polyamide for example, which is of the wall-bracket type wherein a wall engaging edge face 12, disposed normal to a hood or cap portion 14, is secured, for example, to the wall 16 of a building by means of a suitable screw 18, extending through a key-hole like opening 20 formed in the upper end thereof, preferably after a stripped free end portion of a non-metallic, sheathed service entrance cable 22 has been secured to the entrance fitting 10, by means of a split metallic clamp 24, forming a part of the service entrance fitting 10, as hereinafter described, the portion of the cable 22, below the service entrance fitting 10 being secured directly to the building wall 16 by means of a non-metallic toe clamp 26, for example.

In securing the service entrance fitting or head 10, on the prepared or insulation stripped free end portion of the non-metallic, sheathed service entrance cable 22, a pair of separately insulated conductors 28 are exposed and extended into the hood or cap 14 of the entrance fitting 10, and looped to depend the free ends thereof from the front open end of the hood or cap 14, while a plurality of bare ground wires 30, initially surrounding the conductors 28, are bunched together and looped within the rear of the hood or cap portion 14, to depend therefrom in like manner through or under the adjustable outer plate of the split metallic clamp 24, to ground the same after final connection, together with the depending ends of the conductors 28, to an outside power line in known manner.

Further in accordance with the invention and as best shown in FIGURES 2, 3 and 4, the hood or cap 14 of the entrance fitting 10 is provided centrally thereof with an internal partition 32, which extends part way through the hood or cap 14, toward the rear edge face 12, thereof in spaced parallelism with the opposite side faces of the hood or cap whereby to provide a separate insulated path for each of the looped conductor end portions 28.

The rear edge face 12, of the hood or cap 14, is provided at its upper or top end portion with the key-hole like opening 20, therethrough as aforesaid. Below the opening 20, however, the rear edge face 12 is recessed through the balance of its length, as at 34, to provide clearance for the head of the screw 18, and for the rear half of the split clamp 24, with respect to the fixed wall surface 16, leaving at the same time spaced parallel edge rails 36, thereon to provide a better bearing engagement with a more or less uneven wall surface.

As best shown in FIGURES 2 and 4, the opposite or bottom end 40 of the rear edge face 12, depends from the hood or cap 14, at right angles thereto for the attachment thereto of the split clamp 24, through its rear half portion, in a manner now to be described.

As best shown in FIGURES 2 and 5, the opposite side faces of the hood or cap 14 are each provided at the rear of their bottom edge with an integral, projecting, hook-like lug or protuberance 42, from which point the depending end or skirt portion 40 of the inverted hood or cap 14 terminates at each side thereof, in spaced alignment with each of the lugs 42, is a laterally extending projection 44, whereby the lugs 42 serve to receive in edgewise engagement the intermediate portion of one side margin of the rear half of the split clamp 24, while the projections 44, serve to engage the intermediate portion of the opposite side margin of the rear half of the split clamp 24, with the hook-like ends, of the projections 44, extending sufficiently under the wider bent ends of the rear half of the split clamp 24, to retain the same on the depending end 40 of the hood or cap 14, in snap-locked engagement and against relative end-wise movement, the frictional detent-like action between the rear half of the split clamp 24, and the marginal edge portions of the depending end 40, of the recessed wall engaging edge face of the hood or cap 14 being provided by the yielding transverse contraction of the depending end portion 40, which is obtained therein by reason of the open ended slots 46, formed lengthwise thereof as best shown in FIGURE 2.

As best shown in FIGURE 2, the adjustable outer half of the split clamp 24 is provided at one end with a slightly elongated opening and its opposite end suitably slotted whereby the outer clamp half is free to swing downwardly about one of its adjusting screws 48, to place the prepared free end portion of the sheathed service entrance cable 22, thereunder without removing either of the screws 48 from the threaded openings in the rear half of the split clamp 24.

While the invention has been illustrated and described with respect to one embodiment thereof, it is to be expressly understood that various changes and modifications may be made therein without departing from the inventive concept underlying the same. Therefore, the invention is not to be limited except as is necessitated by the prior art and the scope of the appended claims.

What is claimed is:

1. A service cable entrance fitting for non-metallic sheathed service entrance cable comprising a hood member of high impact plastic material having an internal partition extending in the plane thereof and partially dividing the interior of said hood member, said hood member having a wall engaging edge face extending normal thereto with one end portion thereof extending above the closed end of said hood member and having a key-hole opening therethrough adapted for receiving the head of a mounting screw therethrough whereby to hang said hood member on the shank thereof, said wall engaging edge face being recessed below said opening and terminating in a depending end portion laterally off-set from the marginal edge portions of said wall engaging edge face, a plurality of open ended slots formed inwardly of the depending end portion of said edge face whereby the opposite marginal portions thereof are adapted to flex under compression toward each other to snap between the bent end portions of a complimentary half of a U-shaped, adjustable split clamp, and a plurality of spaced projections integral with the opposite margins of said depending end portion adapted to co-act with the bent end portions of the clamp portion frictionally secured to said depending end portion for preventing endwise movement thereof relative to the depending end portion of said hood member.

2. A service cable entrance fitting for sheathed service entrance cable comprising a hood member, said hood member having a wall engaging edge face with one end portion thereof extending above the closed end of said hood member, means on said one end portion adapted for receiving a mounting fastener whereby to affix said hood member to a wall, said wall engaging edge face being recessed below said one end portion and terminating in a depending end portion laterally offset from the marginal edge portions of said wall engaging edge face, a plurality of open ended slots formed inwardly of the depending end portion of said edge face whereby the opposite marginal portions thereof are adapted to flex under compression toward each other to snap between the bent end portions of a complementary half of a U-shaped, adjustable split clamp, and a plurality of spaced projections integral with the opposite margins of said depending end portion adapted to coact with the bent end portions of the clamp portion frictionally secured to said depending end portion for preventing endwise movement thereof relative to the depending end portion of said hood member.

3. A service cable entrance fitting for sheathed service entrance cable comprising a hood member formed of high impact plastic material, said hood member having a wall engaging edge face with one end portion thereof extending above the closed end of said hood member and having an opening therethrough adapted for reception of a mounting means passing therethrough whereby to hang said hood member on a wall, said wall engaging edge face being recessed below said opening and terminating in a depending end portion laterally offset from the marginal edge portion of said wall engaging edge face, a U-shaped clamp half having bent end portions, a plurality of open ended slots formed inwardly of the depending end portion of said edge face whereby the opposite marginal portions thereof are adapted to flex under compression toward each other to snap between the bent end portions of said clamp half, and a plurality of spaced projections integral with the opposite margins of said depending end portion adapted to coact with the bent end portions of the said clamp half frictionally secured to said depending end portion for preventing endwise movement thereof relative to the depending end portion of said hood member, a coacting U-shaped clamp half, fastener means for securing the two clamp halves together in gripping relationship with said sheathed service entrance cable.

4. The invention set forth in claim 3 characterized further in that said hood member includes an internal partition integral therewith extending in the plane thereof and partially dividing the interior of said hood member.

References Cited by the Examiner

UNITED STATES PATENTS

| 2,423,350 | 1/1947 | Stockton | 174—81 X |
| 2,686,216 | 8/1954 | Appleton et al. | 174—81 |

FOREIGN PATENTS

| 812,685 | 9/1951 | Germany. |
| 18,774 | 4/1914 | Denmark. |

LARAMIE E. ASKIN, *Primary Examiner.*

LEWIS H. MYERS, *Examiner.*

J. F. RUGGIERO, *Assistant Examiner.*